United States Patent
Ueoka

(10) Patent No.: US 8,612,112 B2
(45) Date of Patent: Dec. 17, 2013

(54) VEHICLE AND CONTROL METHOD THEREOF

(75) Inventor: Kiyoshiro Ueoka, Nisshin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 702 days.

(21) Appl. No.: 12/084,403

(22) PCT Filed: Aug. 6, 2007

(86) PCT No.: PCT/JP2007/065337
§ 371 (c)(1),
(2), (4) Date: Apr. 30, 2008

(87) PCT Pub. No.: WO2008/078429
PCT Pub. Date: Jul. 3, 2008

(65) Prior Publication Data
US 2010/0222950 A1   Sep. 2, 2010

(30) Foreign Application Priority Data

Dec. 26, 2006   (JP) ................................. 2006-349726

(51) Int. Cl.
*B60K 26/00* (2006.01)
*B60W 20/00* (2006.01)
*F02D 11/00* (2006.01)

(52) U.S. Cl.
USPC ................................... 701/99; 701/70; 477/7

(58) Field of Classification Search
USPC ............ 701/20–25, 99, 70–81; 180/195–200, 180/240–250
See application file for complete search history.

(56) References Cited

U.S. PATENT DOCUMENTS

| 7,152,707 B2 * | 12/2006 | Matsuda | 180/243 |
| 7,367,414 B2 * | 5/2008 | Iida et al. | 180/65.265 |
| 7,632,212 B2 * | 12/2009 | Yamanaka et al. | 477/107 |
| 2002/0056584 A1 * | 5/2002 | Nakasako et al. | 180/248 |
| 2008/0045377 A1 * | 2/2008 | Kaya | 477/43 |

FOREIGN PATENT DOCUMENTS

| JP | 06-098421 A | | 4/1994 |
| JP | 2001025109 A | * | 1/2001 |
| JP | 2003-312318 A | | 11/2003 |
| JP | 2006-081323 A | | 3/2006 |
| JP | 2006-094688 A | | 4/2006 |
| JP | 2006-118359 A | * | 5/2006 |
| JP | 2006-230101 A | | 8/2006 |
| JP | 2006-233801 A | | 9/2006 |

* cited by examiner

*Primary Examiner* — Thomas Tarcza
*Assistant Examiner* — Adam Tissot
(74) *Attorney, Agent, or Firm* — Kenyon & Kenyon LLP

(57) ABSTRACT

When the driver steps on an accelerator peal to a certain depth and practically keeps the accelerator pedal at the certain depth to maintain a substantially constant accelerator opening, a target additional torque, a maximum reflection rate, and an increment of a reflection rate are set based on the accelerator opening and a vehicle speed. The reflection rate is gradually increased by the increment to the maximum reflection rate after elapse of a preset time period since a start of decreasing a base torque demand affected by the accelerator opening and the vehicle speed. An object torque demand is computed as the sum of the base torque demand and an additional torque, which is given as the product of the target additional torque and the gradually increasing reflection rate. The operations of an engine and two motors are then controlled with the setting of the object torque demand.

8 Claims, 9 Drawing Sheets

VEHICLE AND CONTROL METHOD THEREOF

This is a 371 national phase application of PCT/JP2007/065337 filed 6 Aug. 2007, claiming priority to Japanese Patent Application No. JP 2006-349726 filed 26 Dec. 2006, the contents of which are incorporated herein by reference.

TECHNICAL FIELD

The present invention relates to a vehicle and a control method of the vehicle.

BACKGROUND ART

In one proposed structure of a vehicle, the operation of a driving motor is controlled with a corrected output command value obtained by adding an additional value set corresponding to a variation in accelerator operation amount to an output command value affected by a vehicle speed and the accelerator operation amount (see, for example, Patent Document 1). Such operation control of the motor enables adequate acceleration of the vehicle in response to the driver's accelerator operation without switchover of a drive mode.

Patent Document 1: Japanese Patent Laid-Open No. 2006-230101

DISCLOSURE OF THE INVENTION

In the conventional automobile driven with the output power of an engine subjected to the speed change by a stepped transmission, when the driver keeps depression of an accelerator pedal at a relatively large depth to maintain a substantially constant accelerator operation amount, the rotation speed of the engine increases with an increase in vehicle speed to enhance the output torque of the engine. This enables the driver and the passengers of the automobile to have favorable speed-up feeling. In a vehicle driven with operation control of a driving motor based on the vehicle speed and the accelerator operation amount, on the other hand, the operation of the motor is controlled with the setting of a torque command corresponding to the ratio of the accelerator operation amount to a maximum accelerator operation amount based on the rated value of the motor. When the driver keeps depression of the accelerator pedal at the relatively large depth to maintain the substantially constant accelerator operation amount, the output torque of the motor accordingly decreases with an increase in vehicle speed. This causes the driver and the passengers of the vehicle to feel slower acceleration, compared with the conventional automobile. One available measure to give the driver the favorable speed-up feeling at the substantially constant accelerator operation amount controls the operation of the motor with the setting of the torque command with reference to a map designed to restrict a decrease in torque command with an increase in vehicle speed. The correlation of the torque command to the accelerator operation amount designed to be suitable for the high vehicle speed, however, decreases the torque command against the accelerator operation amount at the low vehicle speed and gives an unexpectedly small torque at the low vehicle speed.

In the vehicle and its control method, there would thus be a demand for enabling the driver to have adequate speed-up feeling expected from an accelerator opening and a vehicle speed. In the vehicle and its control method, there would also be a demand for enabling the driver to have favorable speed-up feeling at a substantially fixed accelerator opening and ensuring output of a sufficient torque even at a low vehicle speed.

The present invention accomplishes at least part of the demands mentioned above and the other relevant demands by the following configurations applied to the vehicle and the control method of the vehicle.

One aspect of the invention pertains to a vehicle including: a power source including at least a motor configured to output a driving force for driving the vehicle; an accelerator opening detector designed to detect an accelerator opening; a vehicle speed detector designed to detect a vehicle speed; a base driving force demand setting module configured to set a base driving force demand required for driving based on the detected accelerator opening and the detected vehicle speed, with a tendency of increasing the base driving force demand with an increase in accelerator opening and decreasing the base driving force demand with an increase in vehicle speed; an additional driving force setting module configured to set an additional driving force based on the detected accelerator opening and the detected vehicle speed; an object driving force setting module configured to set an object driving force based on the set base driving force demand and the set additional driving force; and a controller configured to control the power source for driving the vehicle with the set object driving force.

The vehicle according to one aspect of the invention sets the base driving force demand required for driving based on the accelerator opening and the vehicle speed, with the tendency of increasing the base driving force demand with an increase in accelerator opening and decreasing the base driving force demand with an increase in vehicle speed, while setting the additional driving force based on the accelerator opening and the vehicle speed. The vehicle sets the object driving force based on the set base driving force demand and the set additional driving force and controls the power source, which includes at least the motor configured to output the driving force for driving the vehicle, to be driven with the set object driving force. The vehicle of this configuration desirably enables the drive to have adequate speed-up feeling expected from the accelerator opening and the vehicle speed. The adequate setting of the additional driving force based on the accelerator opening and the vehicle speed enables the driver to have favorable speed-up feeling at a substantially fixed accelerator opening without causing an insufficient torque even at a low vehicle speed.

In one preferable application of the vehicle according to the above aspect of the invention, the additional driving force setting module sets the additional driving force to a driving force that gradually increases on assumption of a substantially constant accelerator opening based on the detection of the accelerator opening. The vehicle of this application effectively prevents unexpectedly slow acceleration of the vehicle at a substantially fixed accelerator opening.

In another preferable application of the vehicle according to the above aspect of the invention, the additional driving force setting module sets the additional driving force to a driving force that gradually increases with a decrease of the set base driving force demand on assumption of a substantially constant accelerator opening based on the detection of the accelerator opening. The vehicle of this application effectively prevents unexpectedly slow acceleration of the vehicle even in the event of the decreasing base driving force demand at a substantially fixed accelerator opening.

In still another preferable application of the vehicle according to the above aspect of the invention, the additional driving force setting module sets the additional driving force to a driving force that gradually increases after elapse of a preset time period since a start of decreasing the set base driving force demand on assumption of a substantially constant accelerator opening based on the detection of the accelerator opening. The vehicle of this application effectively prevents unexpectedly slow acceleration of the vehicle even in the event of the decreasing base driving force demand at a substantially fixed accelerator opening.

In one preferable embodiment of the vehicle according to one aspect of the invention, the additional driving force setting module specifies a target additional driving force corresponding to the detected vehicle speed, specifies a reflection rate based on the detected accelerator opening and the detected vehicle speed, and sets the additional driving force to a driving force obtained as a product of the specified target additional driving force and the specified reflection rate. The vehicle of this embodiment enables control of the power source with the adequate setting of the additional driving force based on the accelerator opening and the vehicle speed.

In one preferable structure of the vehicle of this embodiment with the setting of the additional driving force as the product of the target additional driving force and the reflection rate, the additional driving force setting module specifies the target additional driving force with a tendency of increasing with an increase in vehicle speed, and specifies the reflection rate with a tendency of increasing with an increase in accelerator opening and with an increase in vehicle speed. The vehicle of this structure enables control of the power source with the adequate setting of the additional driving force based on the accelerator opening and the vehicle speed.

In another preferable structure of the vehicle of this embodiment with the setting of the additional driving force as the product of the target additional driving force and the reflection rate, the additional driving force setting module sets a maximum reflection rate based on the detected accelerator opening and the detected vehicle speed, sets an increment of the reflection rate per unit time based on the detected accelerator opening and the detected vehicle speed, and specifies the reflection rate to be increased by the set increment within a range of the set maximum reflection rate. This arrangement enables a gradual increase of the additional driving force, while preventing an excess increase of the additional driving force. In the vehicle of this structure, the additional driving force setting module may set the maximum reflection rate with a tendency of increasing with an increase in accelerator opening and with an increase in vehicle speed, and sets the increment of the reflection rate with a tendency of increasing with an increase in accelerator opening.

In another preferable embodiment of the vehicle according to one aspect of the invention, the object driving force setting module sets the object driving force within a range of a previous value of the base driving force demand set immediately before assumption of a substantially constant accelerator opening based on the detection of the accelerator opening. The vehicle of this embodiment effectively prevents the object driving force from exceeding an initial value at a substantially fixed accelerator opening. This arrangement thus prevents an unexpected increase of the driving force at a substantially fixed accelerator opening.

In one preferable structure of the vehicle according to one aspect of the invention, the power source includes: an internal combustion engine; an electric power-mechanical power input output assembly connected to a driveshaft linked with an axle of the vehicle, connected to an output shaft of the internal combustion engine to be independently rotatable from the driveshaft, and configured to output power to the driveshaft and to the output shaft through input and output of electric power and mechanical power; and a motor configured to input and output power from and to the driveshaft. The electric power-mechanical power input output assembly may include: a three shaft-type power input output structure connected with three shafts, the driveshaft, the output shaft, and a rotating shaft and configured to input and output power to and from a residual shaft based on powers input to and output from any two shafts among the three shafts; and a generator configured to input and output power from and to the rotating shaft.

According to another aspect, the present invention is directed to a control method of a vehicle equipped with a power source configured to include at least a motor and to output a driving force for driving the vehicle. The control method sets a base driving force demand required for driving based on an accelerator opening and a vehicle speed, with a tendency of increasing the base driving force demand with an increase in accelerator opening and decreasing the base driving force demand with an increase in vehicle speed, while setting an additional driving force based on the accelerator opening and the vehicle speed. The control method then controls the power source for driving the vehicle with an object driving force set based on the set base driving force demand and the set additional driving force.

The control method of a vehicle according to one aspect of the invention sets the base driving force demand required for driving based on the accelerator opening and the vehicle speed, with the tendency of increasing the base driving force demand with an increase in accelerator opening and decreasing the base driving force demand with an increase in vehicle speed, while setting the additional driving force based on the accelerator opening and the vehicle speed. The vehicle sets the object driving force based on the set base driving force demand and the set additional driving force and controls the power source, which includes at least the motor configured to output the driving force for driving the vehicle, to be driven with the set object driving force. The vehicle of this configuration desirably enables the drive to have adequate speed-up feeling expected from the accelerator opening and the vehicle speed. The adequate setting of the additional driving force based on the accelerator opening and the vehicle speed enables the driver to have favorable speed-up feeling at a substantially fixed accelerator opening without causing an insufficient torque even at a low vehicle speed.

In one preferable structure of the control method of the vehicle of this embodiment, the control method controls the power source with setting of the additional driving force to a driving force that gradually increases with a decrease of the set base driving force demand on assumption of a substantially constant accelerator opening. The control method of the vehicle of this application effectively prevents unexpectedly slow acceleration of the vehicle even in the event of the decreasing base driving force demand at a substantially fixed accelerator opening.

In another preferable structure of the control method of the vehicle of this embodiment, the control method controls the power source with setting of the object driving force within a range of a previous value of the base driving force demand set immediately before assumption of a substantially constant accelerator opening. The control method of the vehicle of this embodiment effectively prevents the object driving force from exceeding an initial value at a substantially fixed accelerator opening. This arrangement thus prevents an unexpected increase of the driving force at a substantially fixed accelerator opening.

BEST MODES FOR CARRYING OUT THE INVENTION

One mode of carrying out the invention is discussed below as a preferred embodiment.

Figure 1:
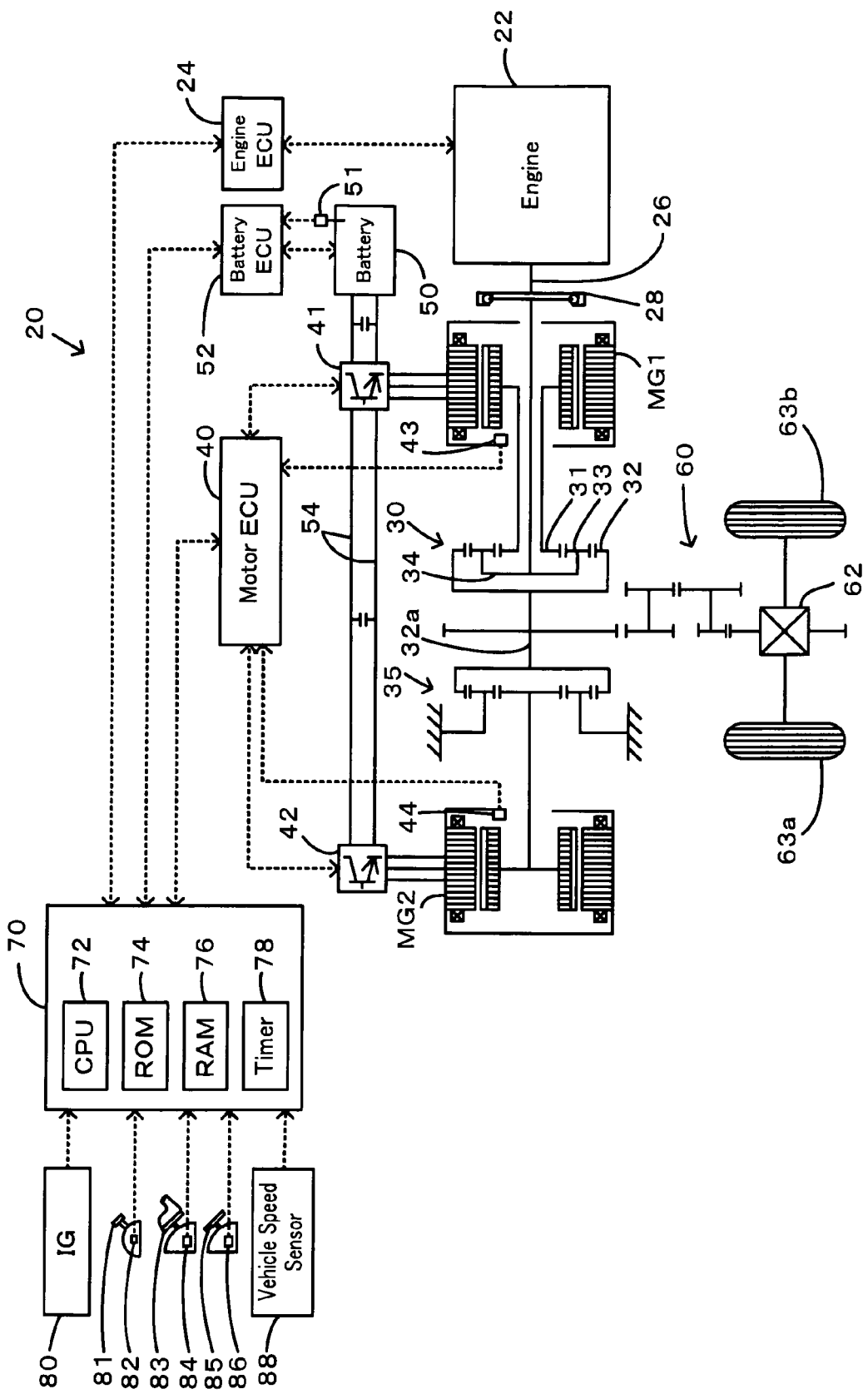
FIG. 1 schematically illustrates the configuration of a hybrid vehicle 20 in one embodiment according to the invention.

FIG. 1 schematically illustrates the construction of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine designed to consume a supply of a hydrocarbon fuel, such as gasoline or light oil, and to output power. The engine 22 is under operation control of an engine electronic control unit (hereafter referred to as engine ECU) 24, for example, fuel injection control, ignition control, and intake air flow control. The engine ECU 24 inputs signals from various sensors that are provided to measure and detect the operating conditions of the engine 22. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also computes a rotation speed of the crankshaft 26 or a rotation speed Ne of the engine 22 from an output signal of a crank position sensor (not shown) attached to the crankshaft 26.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

The motors MG1 and MG2 are constructed as known synchronous motor generators to enable operations as both a generator and a motor. The motors MG1 and MG2 transmit electric power to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 also computes rotation speeds Nm1 and Nm2 of the motors MG1 and MG2 from the output signals of the rotational position detection sensors 43 and 44 representing the rotational positions of the rotors in the motors MG1 and MG2.

The battery 50 is under control and management of a battery electronic control unit (hereafter referred to as battery ECU) 52. The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. With a view to management and control of the battery 50, the battery ECU 52 computes a remaining charge level or current state of charge SOC of the battery 50 from integration of the charge-discharge current measured by the current sensor and sets an input limit Win and an output limit Wout of the battery 50 according to the battery temperature Tb of the battery 50 measured by the temperature sensor 51 and the computed state of charge SOC of the battery 50. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50.

The hybrid electronic control unit 70 is constructed as a microprocessor including a CPU 72, a ROM 74 that stores processing programs, a RAM 76 that temporarily stores data, a timer 78 designed to count time, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
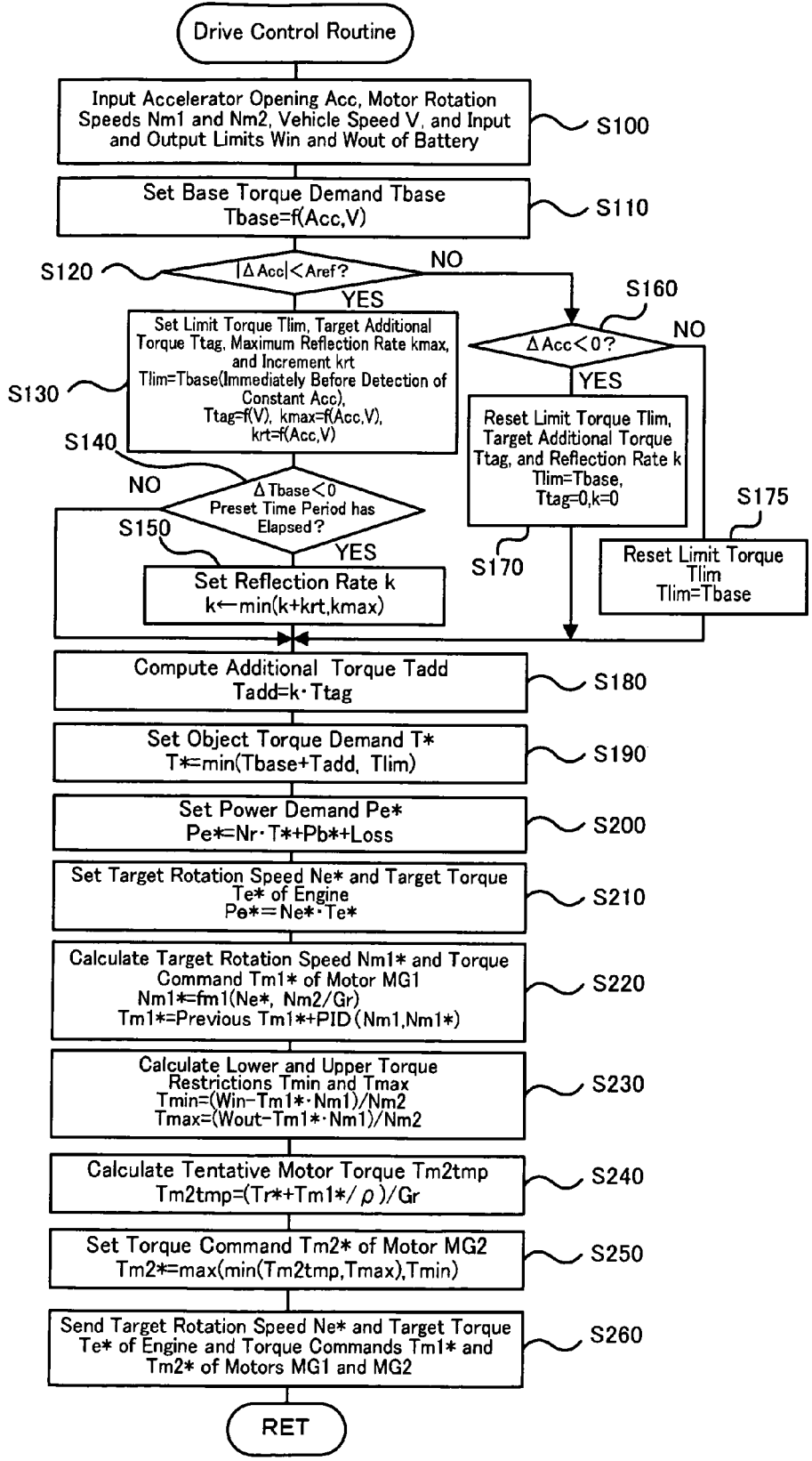
FIG. 2 is a flowchart showing a drive control routine executed by a hybrid electronic control unit 70 in the embodiment.

The description regards the operations of the hybrid vehicle 20 of the embodiment having the configuration discussed above, especially a series of operation control when the driver keeps depression of the accelerator pedal 83. FIG. 2 is a flowchart showing a drive control routine executed by the hybrid electronic control unit 70. This drive control routine is repeatedly performed at preset time intervals, for example, at every several msec.

At the start of the drive control routine of FIG. 2, the CPU 72 of the hybrid ECU 70 first inputs various data required for control, that is, the accelerator opening Acc from the accelerator pedal position sensor 84, the vehicle speed V from the vehicle speed sensor 88, the rotation speeds Nm1 and Nm2 of the motors MG1 and MG2, and the input limit Win and the output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the battery temperature Tb and the state of charge SOC of the battery 50 and are received from the battery ECU 52 by communication.

Figure 3:
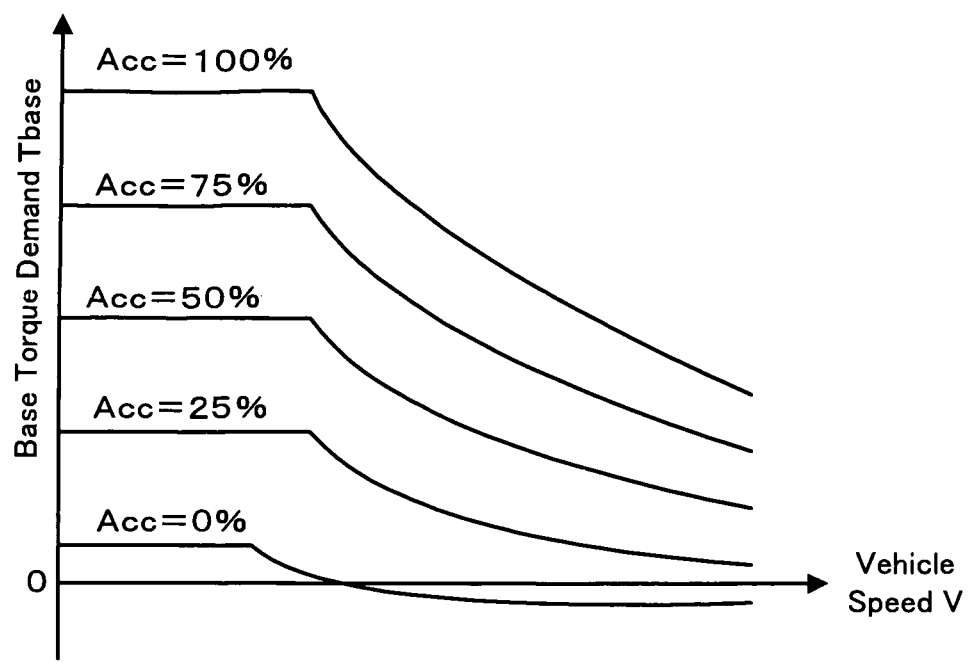
FIG. 3 shows one example of a base torque demand setting map.

After the data input, the CPU 72 sets a base torque demand Tbase to be output to the ring gear shaft 32a or the driveshaft linked with the drive wheels 63a and 63b as a torque required for the hybrid vehicle 20, based on the input accelerator opening Acc and the input vehicle speed V (step S110). A concrete procedure of setting the base torque demand Tbase in this embodiment provides and stores in advance variations in base torque demand Tbase against the accelerator opening Acc and the vehicle speed V as a base torque demand setting map in the ROM 74 and reads the base torque demand Tbase corresponding to the given accelerator opening Acc and the given vehicle speed V from this base torque demand setting map. One example of the base torque demand setting map is shown in FIG. 3. The base torque demand setting map is designed to increase the base torque demand Tbase with an increase in accelerator opening Acc and to decrease the base torque demand Tbase with an increase in vehicle speed V.

The absolute value of an accelerator opening difference ΔAcc between a current accelerator opening Acc input in a current cycle of the drive control routine and a previous accelerator opening Acc input in a previous cycle of the drive control routine is compared with a preset reference value Aref (step S120). The reference value Aref defines an allowable range of variation in accelerator opening Acc that is detectable as a constant accelerator opening Acc and is set to a relatively small value, for example, 2%, 3%, or 5%. The subsequent processing flow is on the assumption that the driver steps on the accelerator pedal 83 to a relatively large depth and substantially keeps the accelerator pedal 83 at the relatively large depth. Since the accelerator pedal 83 is kept at the substantially fixed depth, the absolute value of the accelerator opening difference ΔAcc is determined to be less than the preset reference value Aref.

Figure 4:
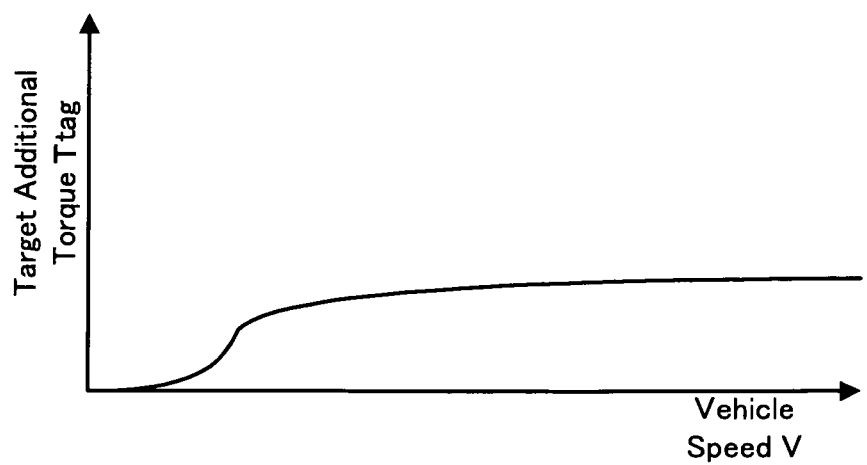
FIG. 4 shows one example of a target additional torque setting map.
Figure 5:
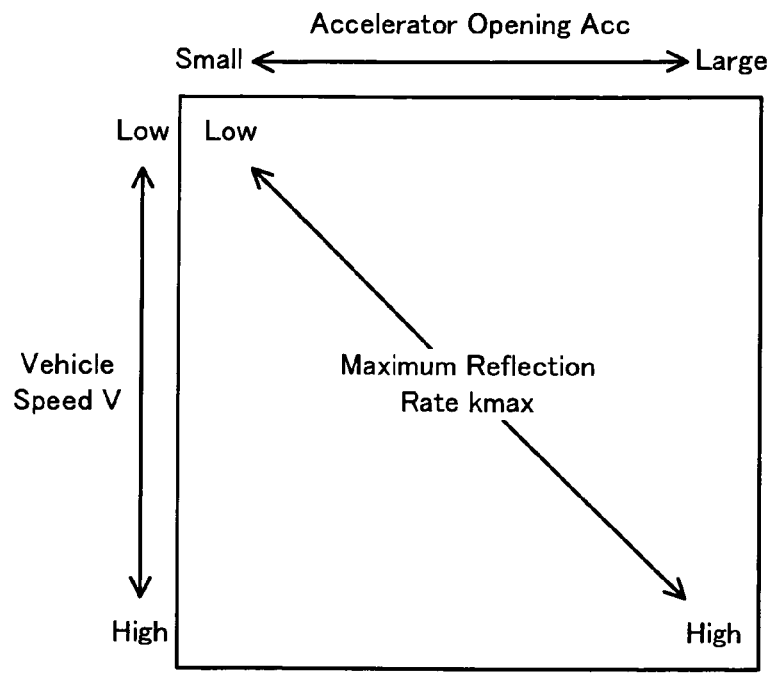
FIG. 5 shows the tendency of a change in maximum reflection rate kmax against accelerator opening Acc and vehicle speed V in a maximum reflection rate setting map.
Figure 6:
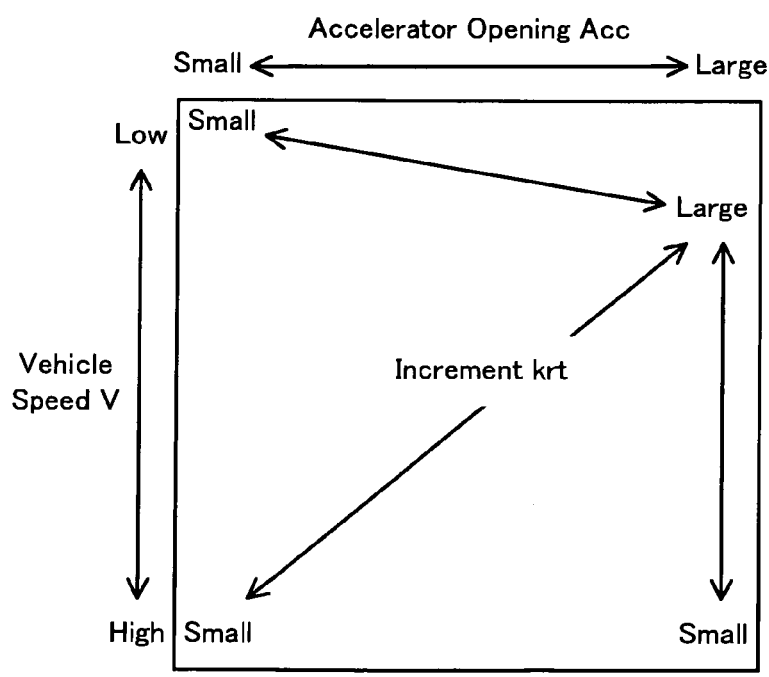
FIG. 6 shows the tendency of variations in increment krt of a reflection rate k against the accelerator opening Acc and the vehicle speed V in an increment setting map.

In response to the result of the comparison indicating the absolute value of the accelerator opening difference ΔAcc less than the preset reference value Aref, the CPU 72 sets a limit torque Tlim equal to a last value of the base torque demand Tbase set in a last execution cycle of this routine immediately before detection of the constant accelerator opening Acc, sets a target additional torque Ttag corresponding to the vehicle speed V, and sets a maximum reflection rate kmax and an increment krt of a reflection rate k based on the accelerator opening Acc and the vehicle speed V (step S130). The target additional torque Ttag represents an object torque value to be added to the base torque demand Tbase in response to detection of the constant accelerator opening Acc. The target additional torque Ttag is designed to increase with an increase in vehicle speed V. A concrete procedure of setting the target additional torque Ttag in this embodiment provides and stores in advance a variation in target additional torque Ttag against the vehicle speed V as a target additional torque setting map in the ROM 74 and reads the target additional torque Ttag corresponding to the given vehicle speed V from this target additional torque setting map. One example of the target additional torque setting map is shown in FIG. 4. The maximum reflection rate kmax represents an upper limit of the reflection rate k of the target additional torque Ttag to be added to the base torque demand Tbase in response to detection of the constant accelerator opening Acc. The maximum reflection rate kmax is within a range of or over 0 but less than 1. The maximum reflection rate kmax is designed to increase with an increase in accelerator opening Acc and with an increase in vehicle speed V. A concrete procedure of setting the maximum reflection rate kmax in this embodiment provides and stores in advance a variation in maximum reflection rate kmax against the accelerator opening Acc and the vehicle speed V as a maximum reflection rate setting map in the ROM 74 and reads the maximum reflection rate kmax corresponding to the given accelerator opening Acc and the given vehicle speed V from this maximum reflection rate setting map. FIG. 5 shows the tendency of a change in maximum reflection rate kmax against the accelerator opening Acc and the vehicle speed V in the maximum reflection rate setting map. The increment krt of the reflection rate k represents a rate value for gradually increasing the reflection rate k of the target additional torque Ttag to be added to the base torque demand Tbase in response to detection of the constant accelerator opening Acc. Here the reflection rate k is within a range of or over 0 but less than 1. The increment krt of the reflection rate k is designed to increase with an increase in accelerator opening Acc. A concrete procedure of setting the increment krt of the reflection rate k provides and stores in advance variations in increment krt of the reflection rate k against the accelerator opening Acc and the vehicle speed V as an increment setting map in the ROM 74 and reads the increment krt of the reflection rate k corresponding to the given accelerator opening Acc and the given vehicle speed V from this increment setting map. FIG. 6 shows the tendency of variations in increment krt of the reflection rate k against the accelerator opening Acc and the vehicle speed V in the increment setting map. The limit torque Tlim represents an upper limit torque to prevent an object torque demand T* (explained later) from exceeding the last value of the base torque demand Tbase set in the last execution cycle of this routine immediately before detection of the constant accelerator opening Acc.

After setting the limit torque. Tlim, the target additional torque Ttag, the maximum reflection rate kmax, and the increment krt of the reflection rate k in the above manner, it is determined whether there is a negative base torque demand difference ΔTbase between a current setting of the base torque demand Tbase in a current cycle of the drive control routine and a previous setting of the base torque demand Tbase in a previous cycle of the drive control routine (step S140). The negative base torque demand difference ΔTbase indicates decreasing of the base torque demand Tbase. It is also determined at step S140 whether a preset time period has elapsed since a start of decreasing the base torque demand Tbase. The base torque demand Tbase starts decreasing with an increase in vehicle speed V to a certain degree at a fixed accelerator opening Acc as shown in FIG. 3. The processing of step S140 waits for elapse of the preset time period since the start of decreasing the base torque demand Tbase. The preset time period may be, for example, 1 second or 1.5 seconds.

When the base torque demand difference ΔTbase is not a negative value or when the preset time period has not yet elapsed since detection of a negative value of the base torque demand difference ΔTbase at step S140, an additional torque Tadd is computed by multiplication of the target additional torque Ttag by the reflection rate k (step S180). The smaller between the limit torque Tlim and the sum of the base torque demand Tbase and the computed additional torque Tadd is set to the object torque demand T* (step S190). When the base torque demand difference ΔTbase is not a negative value or when the preset time period has not yet elapsed since detection of a negative value of the base torque demand difference ΔTbase, the reflection rate k is set to an initial value 0. The additional torque Tadd is accordingly given as 0. The limit torque Tlim is set equal to the last value of the base torque demand Tbase set in the last execution cycle of this routine immediately before detection of the constant accelerator opening Acc. The limit torque Tlim is thus equal to the base torque demand Tbase or otherwise, after the start of decreasing the base torque demand Tbase, is greater than the base torque demand Tbase. When the base torque demand difference ΔTbase is not a negative value or when the preset time period has not yet elapsed since detection of a negative value of the base torque demand difference ΔTbase, the base torque demand Tbase is set to the object torque demand T*.

Figure 7:
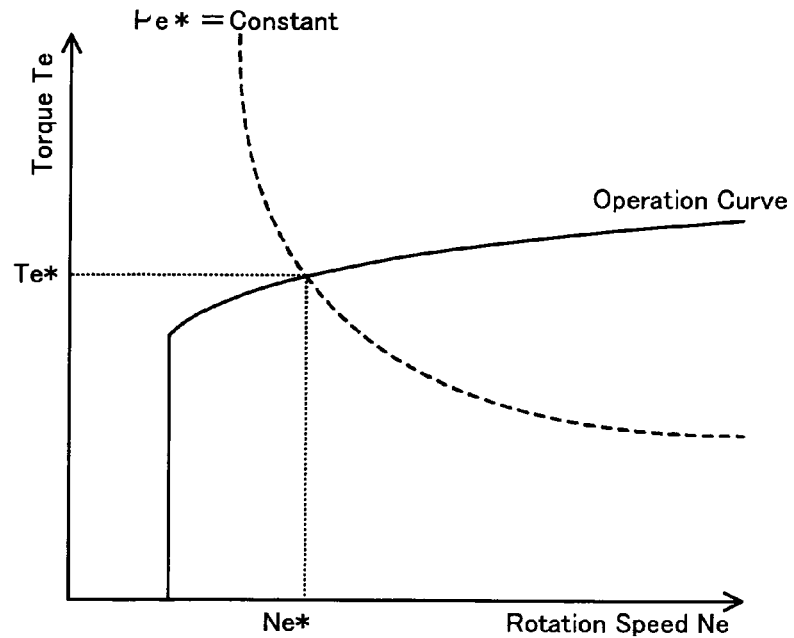
FIG. 7 shows an operation curve of an engine 22 and a correlation curve of a target torque Te* to a target rotation speed Ne*.

The CPU 72 subsequently computes a power demand Pe* required for the engine 22 as the sum of the product of the set object torque demand T* and a rotation speed Nr of the ring gear shaft 32a, a charge-discharge power demand Pb* to be charged into or discharged from the battery 50, and a potential loss (step S200), and sets a target rotation speed Ne* and a target torque Te* of the engine 22 based on the computed power demand Pe* (step S210). The rotation speed Nr of the ring gear shaft 32a may be obtained by multiplying the vehicle speed V by a preset conversion factor or otherwise by dividing the rotation speed Nm2 of the motor MG2 by a gear ratio Gr of the reduction gear 35. In this embodiment, the target rotation speed Ne* and the target torque Te* of the engine 22 are set according to an operation curve of ensuring efficient operation of the engine 22 and a curve of the power demand Pe*. FIG. 7 shows an operation curve of the engine 22 and a correlation curve of the target torque Te* to the target rotation speed Ne*. As clearly shown in FIG. 7, the target rotation speed Ne* and the target torque Te* are given as an intersection of the operation curve and the correlation curve of constant power demand Pe* (=Ne*×Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S220):

$$Nm1^* = Ne^* \cdot (1+\rho)/\rho - Nm2/(Gr \cdot \rho) \quad (1)$$

$$Tm1^* = \text{Previous} Tm1^* + k1(Nm1^* - Nm1) + k2 \int (Nm1^* - Nm1) dt \quad (2)$$

Figure 8:
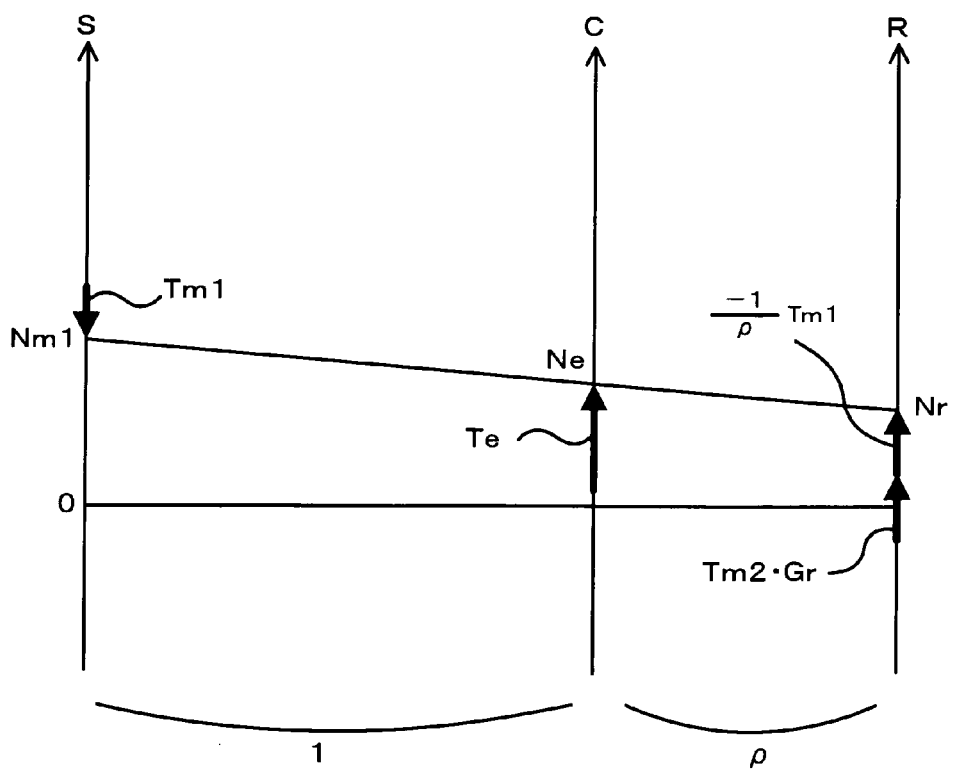
FIG. 8 is an alignment chart showing torque-rotation speed dynamics of respective rotational elements included in a power distribution integration mechanism 30.

Equation (1) is a dynamic relational expression of the rotational elements included in the power distribution integration mechanism 30. FIG. 8 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from the alignment chart of FIG. 8. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as allowable minimum and maximum torques output from the motor MG2 according to Equations (3) and (4) given below (step S230):

$$T\min = (Win - Tm1^* \cdot Nm1)/Nm2 \quad (3)$$

$$T\max = (Wout - Tm1^* \cdot Nm1)/Nm2 \quad (4)$$

The lower torque restriction Tmin and the upper torque restriction Tmax are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then calculates a tentative motor torque Tm2tmp to be output from the motor MG2 from the object torque demand T*, the torque command Tm1* of the motor MG1, the gear ratio ρ of the power distribution integration mechanism 30, and the gear ratio Gr of the reduction gear 35 according to Equation (5) given below (step S240):

$$Tm2tmp = (T^* + Tm1^*/\rho)/Gr \quad (5)$$

The CPU 72 then limits the calculated tentative motor torque Tm2tmp by the lower and upper torque restrictions Tmin and Tmax to set a torque command Tm2* of the motor MG2 (step S250). Setting the torque command Tm2* of the motor MG2 in this manner basically restricts the object torque demand T* to be output to the ring gear shaft 32a or the driveshaft in the range of the input limit Win and the output limit Wout of the battery 50. Equation (5) is readily introduced from the alignment chart of FIG. 8.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S260) and terminates the drive control routine of FIG. 2. The engine ECU 24 receives the settings of the target rotation speed Ne* and the target torque Te* and performs fuel injection control, ignition control, and other required controls to drive the engine 22 at a drive point defined by the combination of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*.

Figure 9:
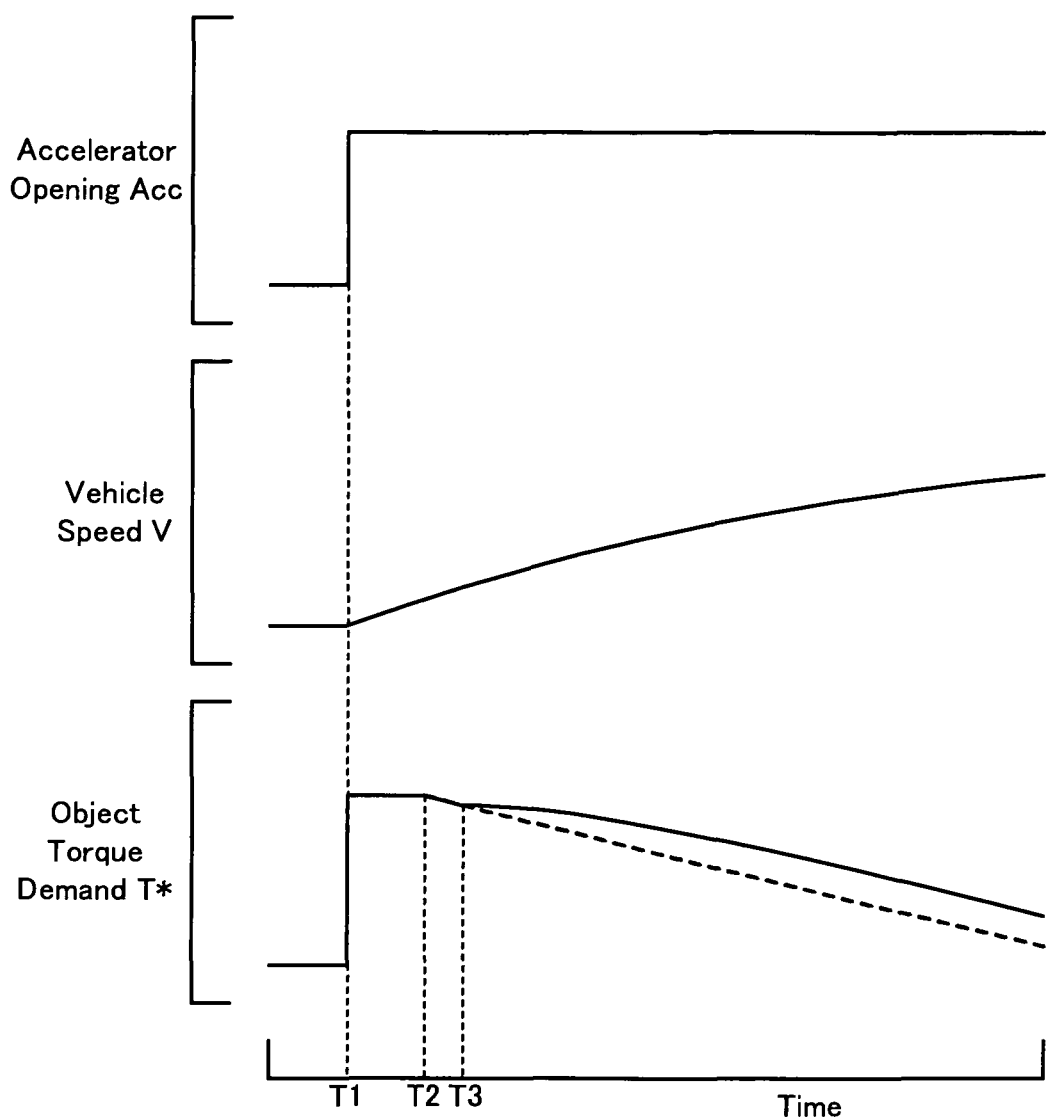
FIG. 9 shows time changes of the accelerator opening Acc, the vehicle speed V, and an object torque demand T* when the driver steps on an accelerator pedal 83 to a certain depth and substantially keeps the accelerator pedal 83 at the certain depth.

When it is determined at step S140 that the preset time period has elapsed since detection of a negative value of the base torque demand difference ΔTbase, the reflection rate k is updated to the smaller between the maximum reflection rate kmax and the sum of the reflection rate k and the increment krt (step S150). The additional torque Tadd is then computed by multiplication of the target additional torque Ttag by the updated reflection rate k (step S180). The CPU 72 sets the smaller between the limit torque Tlim and the sum of the base torque demand Tbase and the computed additional torque Tadd to the object torque demand T* (step S190), and sets and sends the target rotation speed Ne* and the target torque Te* of the engine 22 and the torque commands Tm1* and Tm2* of the motors MG1 and MG2 based on the set object torque demand T* (steps S200 to S260). The drive control routine is then terminated. After elapse of the preset time period since detection of a negative value of the base torque demand difference ΔTbase, the reflection rate k is gradually increased by the increment krt in every cycle of this routine toward the maximum reflection rate kmax. The additional torque Tadd is correspondingly increased in every cycle of this routine. The base torque demand Tbase decreases with an increase in vehicle speed V. The degree of the decrease in base torque demand Tbase is moderate, however, since the sum of the additional torque Tadd and the base torque demand Tbase set to the object torque demand T* is not greater than the limit torque Tlim. Such a moderate decrease of the base torque demand Tbase desirably enables the driver to have favorable speed-up feeling at a fixed accelerator opening Acc. After the gradually increasing reflection rate k reaches the maximum reflection rate kmax, the reflection rate k is fixed to the maximum reflection rate kmax. This setting effectively prevents an excess increase of the additional torque Tadd when fixation of the accelerator opening Acc to a certain value continues for a long time period. The gradually increasing additional torque Tadd naturally increases the sum of the base torque demand Tbase and the additional torque Tadd. The object torque demand T* is, however, restricted not to exceed the limit torque Tlim. Such control effectively prevents an unexpected increase of driving force at a fixed accelerator opening Acc. FIG. 9 shows time changes of the accelerator opening Acc, the vehicle speed V, and the object torque demand T* when the driver steps on the accelerator pedal 83 to a certain depth and substantially keeps the accelerator pedal 83 at the certain depth. In the graph of the object torque demand T*, a solid line curve represents a time change of the object torque demand T* in the embodiment, whereas a broken line curve represents a time change of the base torque demand Tbase. In the illustrated example of FIG. 9, the accelerator opening Acc is set to a relatively large constant value at a time point T1. The base torque demand Tbase is directly set to the object torque demand T* until a time point T2 when the vehicle speed V increases to a specific level. The base torque demand Tbase starts decreasing at the time point T2. After a time point T3 with elapse of a preset time period since the time point T2, the additional torque Tadd to be added to the base torque demand Tbase takes a value other than 0, so that the object torque demand T* becomes greater than the base torque demand Tbase. As the reflection rate k is gradually increased by the increment krt in the rating process, the additional torque Tadd gradually increases. The reflection rate k is, however, not infinitely increased but is limited to the maximum reflection rate kmax.

The driver may release the accelerator pedal 83 after stepping on and keeping the accelerator pedal 83 at the certain depth. In this case, the result of comparison indicates a change of the accelerator opening Acc at step S120. It is subsequently determined whether the accelerator opening difference ΔAcc is a negative value (step S160). Since the driver releases the accelerator pedal 83, there is a negative accelerator opening difference ΔAcc. The CPU 72 resets the limit torque Tlim to the newly set base torque demand Tbase and resets the target additional torque Ttag and the reflection rate k to 0 (step S170). The additional torque Tadd is then computed by multiplication of the reset target additional torque Ttag by the reset reflection rate k (step S180). The CPU 72 sets the object torque demand T* by restricting the sum of the newly set base torque demand Tbase and the computed additional torque Tadd to the reset limit torque Tlim (step S190), and sets and sends the target rotation speed Ne* and the target torque Te* of the engine 22 and the torque commands Tm1* and Tm2* of the motors MG1 and MG2 based on the set object torque demand T* (steps S200 to S260). The drive control routine is then terminated. In this state, since the target additional torque Ttag and the reflection rate k are both reset to 0, the additional torque Tadd as their product is also equal to 0. The limit torque Tlim is reset to the newly set base torque demand Tbase, so that the newly set base torque demand Tbase is directly set to the object torque demand T*. The operations of the engine 22 and the motors MG1 and MG2 are accordingly controlled with the settings of the target rotation speed Ne* and the target torque Te* of the engine 22 and the torque commands Tm1* and Tm2* of the motors MG1 and MG2 based on the newly set base torque demand Tbase.

The driver may increase the depression of the accelerator pedal 83 to a greater depth after stepping on and keeping the accelerator pedal 83 at the certain depth. In this case, the result of comparison indicates a change of the accelerator opening Acc at step S120. It is subsequently determined whether the accelerator opening difference ΔAcc is a negative value (step S160). Since the driver increases the depression of the accelerator pedal 83 to the greater depth, there is a positive accelerator opening difference ΔAcc. The CPU 72 resets the limit torque Tlim to the newly set base torque demand Tbase (step S175) and computes the additional torque Tadd by multiplication of the target additional torque Ttag by the reflection rate k (step S180). The CPU 72 sets the object torque demand T* by restricting the sum of the newly set base torque demand Tbase and the computed additional torque Tadd to the reset limit torque Tlim (step S190), and sets and sends the target rotation speed Ne* and the target torque Te* of the engine 22 and the torque commands Tm1* and Tm2* of the motors MG1 and MG2 based on the set object torque demand T* (steps S200 to S260). The drive control routine is then terminated. In this state, since the limit torque Tlim is reset to the newly set base torque demand Tbase, the newly set base torque demand Tbase is set to the object torque demand T*, irrespective of the values of the reflection rate k and the target additional torque Ttag. In response to an increase of the accelerator opening Acc accompanied with the driver's increased depression of the accelerator pedal 83, the newly set base torque demand Tbase becomes greater than the previous limit torque Tlim prior to the resetting, thus increasing the object torque demand T*. When the driver substantially keeps the accelerator pedal 83 at the greater depth, the result of comparison indicates a constant accelerator opening Acc at step S120. The CPU 72 then newly sets the limit torque Tlim, the target additional torque Ttag, the maximum reflection rate kmax, and the increment krt of the reflection rate k, based on the previous base torque demand Tbase set immediately before detection of the constant accelerator opening Acc, as well as on the accelerator opening Acc and the vehicle speed V corresponding to the previous base torque demand Tbase, and executes the series of processing with regard to the constant accelerator opening Acc as explained above.

In the hybrid vehicle 20 of the embodiment described above, when the driver steps on the accelerator peal 83 to a certain depth and practically keeps the accelerator pedal 83 at the certain depth to maintain a substantially constant accelerator opening Acc, the object torque demand T* is set to the sum of the additional torque Tadd and the base torque demand Tbase, which is set after elapse of the preset time period since a start of decreasing the base torque demand Tbase. The operations of the engine 22 and the motors MG1 and MG2 are controlled with the settings of the target rotation speed Ne* and the target torque Te* of the engine 22 and the torque commands Tm1* and Tm2* of the motors MG1 and MG2 based on the object torque demand T*. Such control prevents the driver from feeling unexpectedly slow acceleration due to the decreasing base torque demand Tbase but enables the driver to have favorable speed-up feeling expected from the accelerator opening Acc and the vehicle speed V. The base torque demand Tbase is set according to the accelerator opening Acc even at the low vehicle speed V. Such setting desirably prevents the driver from feeling insufficient torque at the low vehicle speed V. The additional torque Tadd is determined by multiplication of the target additional torque Ttag by the reflection rate k gradually increasing by the rating process. This gradually increases the object torque demand T* and thereby effectively deals with a decrease of the base torque demand Tbase. The limitation of the reflection rate k to the maximum reflection rate kmax prevents an excess increase of the additional torque Tadd. The sum of the base torque demand Tbase and the additional torque Tadd set to the object torque demand T* is restricted to the limit torque Tlim, which is equal to the previous base torque demand Tbase set immediately before detection of the constant accelerator opening Acc. This arrangement desirably prevents an unexpected increase of the object torque demand T* at a fixed accelerator opening Acc.

In the hybrid vehicle 20 of the embodiment, when the driver steps on the accelerator peal 83 to a certain depth and practically keeps the accelerator pedal 83 at the certain depth to maintain a substantially constant accelerator opening Acc, the object torque demand T* is set to the sum of the additional torque Tadd and the base torque demand Tbase, which is set after elapse of the preset time period since a start of decreasing the base torque demand Tbase. In one modification, the object torque demand T* may be set to the sum of the additional torque Tadd and the base torque demand Tbase, which is set immediately after the start of decreasing the base torque demand Tbase without waiting for elapse of the preset time period. In another modification, when the driver steps on the accelerator peal 83 to a certain depth and practically keeps the accelerator pedal 83 at the certain depth to maintain a substantially constant accelerator opening Acc, the object torque demand T* may be set to the sum of the additional torque Tadd and the base torque demand Tbase, which is set after elapse of a preset time period irrespective of a decrease of the base torque demand Tbase.

In the hybrid vehicle 20 of the embodiment, when the driver steps on the accelerator peal 83 to a certain depth and practically keeps the accelerator pedal 83 at the certain depth to maintain a substantially constant accelerator opening Acc, the additional torque Tadd is computed by multiplication of the target additional torque Ttag by the reflection rate k, which is increased by the rating process after elapse of the preset time period since a start of decreasing the base torque demand Tbase. The object torque demand T* is then determined as the sum of the computed additional torque Tadd and the base torque demand Tbase. One modification may compute the additional torque Tadd by multiplication of the target additional torque Ttag by the reflection rate k, which is increased without the rating process, and set the sum of the computed additional torque Tadd and the base torque demand Tbase to the object torque demand T*. Another modification may compute the additional torque Tadd by multiplication of the target additional torque Ttag by the reflection rate k, which is not increased, and set the sum of the computed additional torque Tadd and the base torque demand Tbase to the object torque demand T*. In the last case, the additional torque Tadd is not gradually increased.

The hybrid vehicle 20 of the embodiment sets the target additional torque Ttag corresponding to the vehicle speed V. The target additional torque Ttag may alternatively be set irrespective of the vehicle speed V.

The hybrid vehicle 20 of the embodiment sets the maximum reflection rate kmax based on the accelerator opening Acc and the vehicle speed V. The maximum reflection rate kmax, however, may be set corresponding to only the accelerator opening Acc, may be set corresponding to only the vehicle speed V, or may be set irrespective of the accelerator opening Acc and the vehicle speed V.

The hybrid vehicle 20 of the embodiment sets the increment krt of the reflection rate k based on the accelerator opening Acc and the vehicle speed V. The increment krt of the reflection rate k, however, may be set corresponding to only the accelerator opening Acc, may be set corresponding to only the vehicle speed V, or may be set irrespective of the accelerator opening Acc and the vehicle speed V.

The hybrid vehicle 20 of the embodiment sets the limit torque Tlim to the previous base torque demand Tbase set immediately before detection of a substantially constant accelerator opening Acc. The limit torque Tlim may alternatively be set to a new base torque demand Tbase set immediately after detection of a substantially constant accelerator opening Acc.

Figure 10:
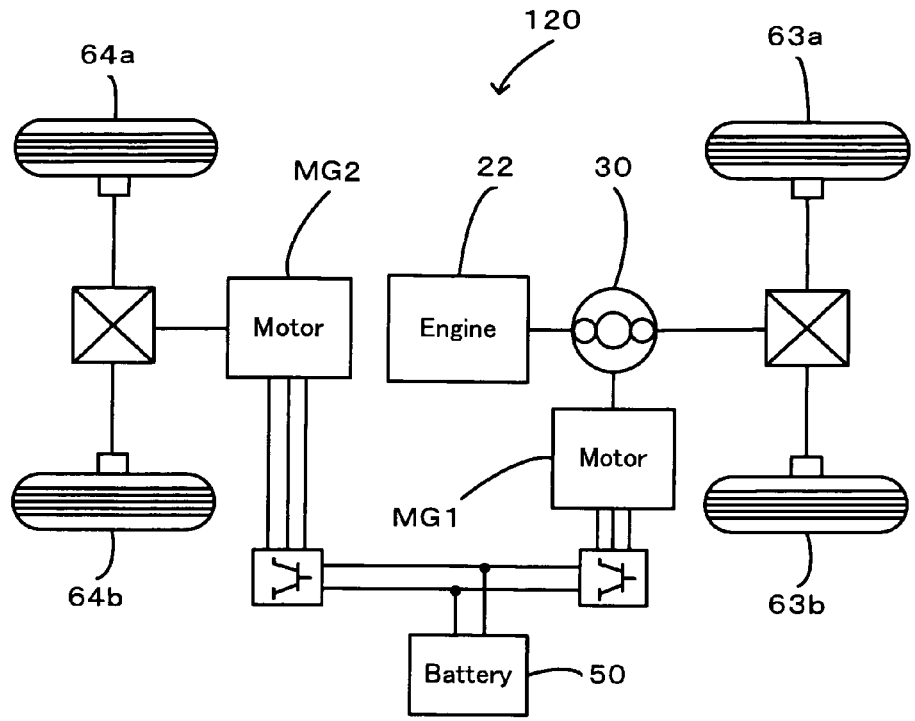
FIG. 10 schematically illustrates the configuration of another hybrid vehicle 120 in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 10, the power of the motor MG2 may be output to another axle (that is, an axle linked with wheels 64a and 64b), which is different from an axle connected with the ring gear shaft 32a (that is, an axle linked with the wheels 63a and 63b).

Figure 11:
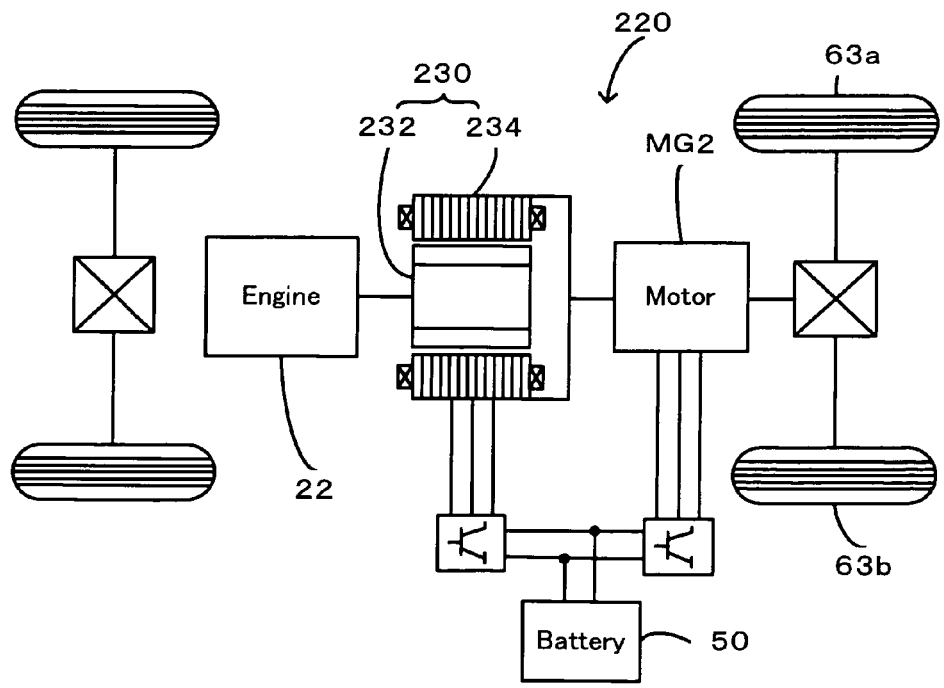
FIG. 11 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 11, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

Figure 12:
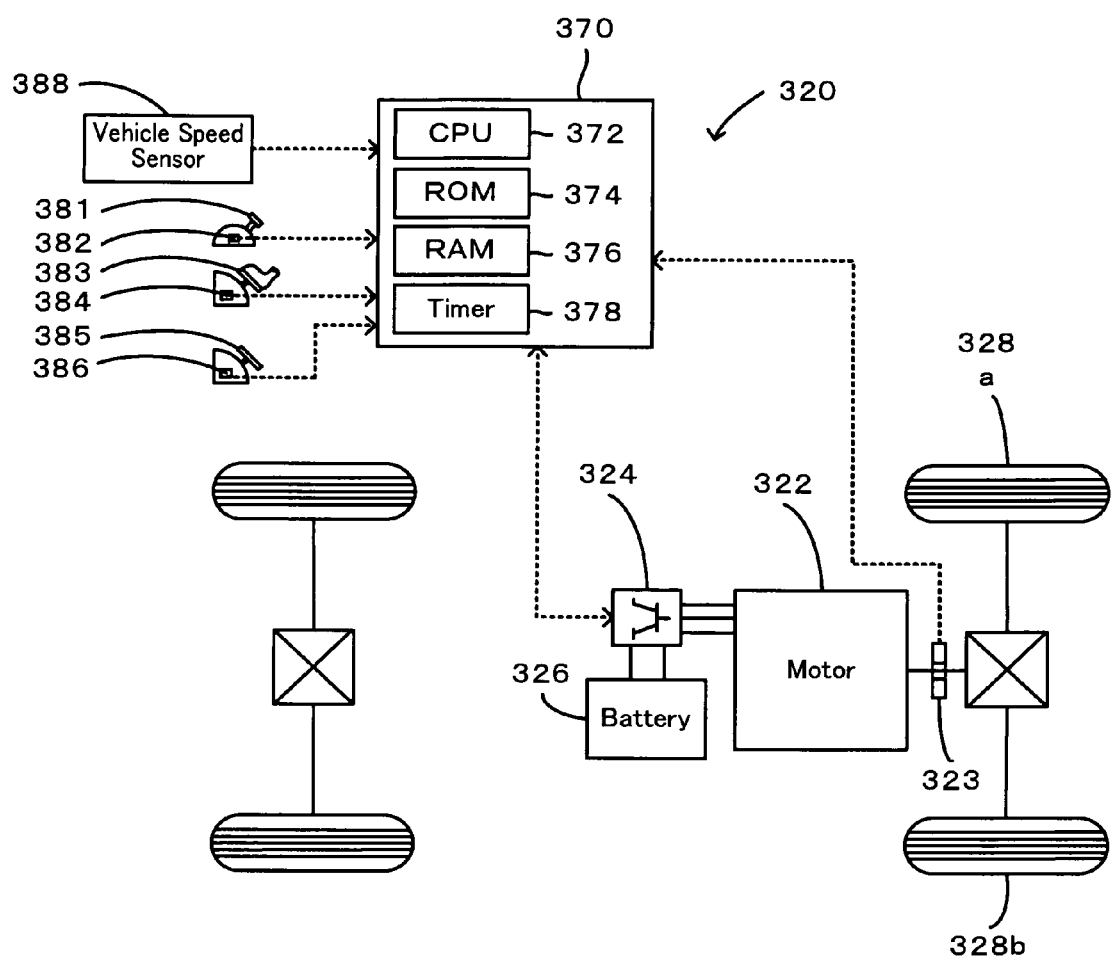
FIG. 12 schematically illustrates the configuration of an electric vehicle 320 in a second embodiment according to the invention.

FIG. 12 schematically illustrates the configuration of an electric vehicle 320 in a second embodiment according to the invention. As illustrated, the electric vehicle 320 of the second embodiment has a motor 322 configured to output power to an axle linked with drive wheels 328a and 328b, an inverter 324 configured to drive the motor 322, and an electronic control unit 370 designed to control the operations of the whole electric vehicle 320.

The motor 322 is constructed as a known synchronous motor generator to enable operations as both a generator and a motor, and is configured to transmit electric power from and to a battery 326 via the inverter 324.

The electronic control unit 370 is constructed as a microprocessor including a CPU 372, a ROM 374 configured to store processing programs, a RAM 376 configured to temporarily store data, a timer 378 designed to count time, and input and output ports (not shown). The electronic control unit 370 receives, via its input port, a gearshift position SP or a current setting position of a gearshift lever 381 from a gearshift position sensor 382, an accelerator opening Acc or the driver's depression amount of an accelerator pedal 383 from an accelerator pedal position sensor 384, a brake pedal position BP or the driver's depression amount of a brake pedal 385 from a brake pedal position sensor 386, a vehicle speed V from a vehicle speed sensor 388, a resolver signal from a resolver 323 attached to a rotating shaft of the motor 322, and phase currents measured by a current sensor (not shown) attached to the inverter 324. The electronic control unit 370 outputs a switching control signal to the inverter 324. The electronic control unit 370 also computes a rotation speed Nm of the motor 322 from the resolver signal output from the resolver 323.

Figure 13:
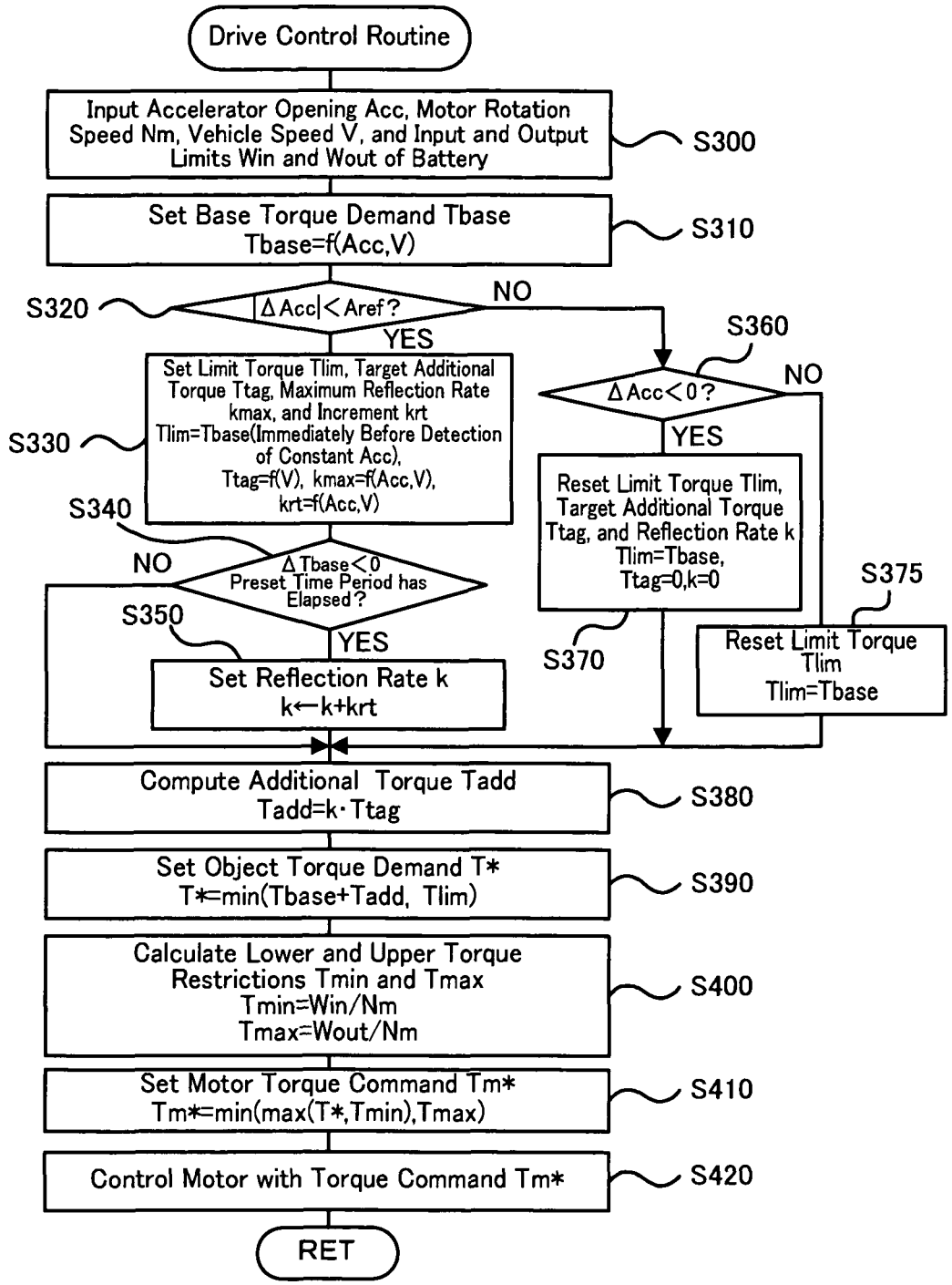
FIG. 13 is a flowchart showing a drive control routine executed by an electronic control unit 370 in the second embodiment.

The description regards the operations of the electric vehicle 320 of the second embodiment having the above configuration, especially a series of operation control when the driver keeps depression of the accelerator pedal 383. FIG. 13 is a flowchart showing a drive control routine executed by the electronic control unit 370. This drive control routine is repeatedly performed at preset time intervals, for example, at every several msec. The processing flow of steps S300 to S390 in the drive control routine of FIG. 13 is practically identical with the processing flow of steps S100 to S190 in the drive control routine of the first embodiment shown in FIG. 2, except that the input of the rotation speeds Nm1 and Nm2 of the motors MG1 and MG2 is replaced by the input of the rotation speed Nm of the motor 322. In the electric vehicle 320 of the second embodiment, a torque command Tm* of the motor 322 is set with restriction of the set object torque demand T* by lower and upper torque restrictions Tmin and Tmax, which are obtained by dividing input and output limits Win and Wout of the battery 326 by the rotation speed Nm of the motor 322 (steps S400 and S410). The drive control routine controls the operation of the motor 322 with the set torque command Tm* (step S420) and is terminated.

The electric vehicle 320 of the second embodiment performs the series of drive control that is similar to the series of drive control performed by the hybrid vehicle 20 of the first embodiment and thereby has the similar effects and advantages to those of the hybrid vehicle 20 of the first embodiment. In the electric vehicle 320 of the second embodiment, when the driver steps on the accelerator peal 383 to a certain depth and practically keeps the accelerator pedal 383 at the certain depth to maintain a substantially constant accelerator opening Acc, the object torque demand T* is set to the sum of the additional torque Tadd and the base torque demand Tbase, which is set after elapse of the preset time period since a start of decreasing the base torque demand Tbase. The operation of the motor 322 is controlled with the setting of the torque command Tm* of the motor 322 based on the object torque demand T*. Such control prevents the driver from feeling unexpectedly slow acceleration due to the decreasing base torque demand Tbase but enables the driver to have favorable speed-up feeling expected from the accelerator opening Acc and the vehicle speed V. The base torque demand Tbase is set according to the accelerator opening Acc even at the low vehicle speed V. Such setting desirably prevents the driver from feeling insufficient torque at the low vehicle speed V. The additional torque Tadd is determined by multiplication of the target additional torque Ttag by the reflection rate k gradually increasing by the rating process. This gradually increases the object torque demand T* and thereby effectively deals with a decrease of the base torque demand Tbase. The limitation of the reflection rate k to the maximum reflection rate kmax prevents an excess increase of the additional torque Tadd. The sum of the base torque demand Tbase and the additional torque Tadd set to the object torque demand T* is restricted to the limit torque Tlim, which is equal to the previous base torque demand Tbase set immediately before detection of the constant accelerator opening Acc. This arrangement desirably prevents an unexpected increase of the object torque demand T* at a fixed accelerator opening Acc.

The first embodiment and the second embodiment described above respectively regard the hybrid vehicle 20 and the electric vehicle 320. The technique of the invention is also applicable to a control method of a vehicle, for example, the hybrid vehicle or the electric vehicle.

The primary elements in the embodiments are mapped to the primary constituents in the claims of the invention as described below. In the first embodiment, the power system including the engine 22, the power distribution integration mechanism 30, and the two motors MG1 and MG2 is equivalent to the 'power source' of the invention. The accelerator pedal position sensor 84 and the vehicle speed sensor 88 are respectively equivalent to the 'accelerator opening detector' and the 'vehicle speed detector' of the invention. The hybrid electronic control unit 70 executing the processing of step S110 in the drive control routine of FIG. 2 corresponds to the 'base driving force demand setting module' of the invention. The processing of step S110 sets the base torque demand Tbase based on the accelerator opening Acc and the vehicle speed V with reference to the base torque demand setting map of FIG. 3, which is designed to increase with an increase in accelerator opening Acc and to decrease with an increase in vehicle speed V. The hybrid electronic control unit 70 executing the processing of steps S130 to S180 in the drive control routine of FIG. 2 corresponds to the 'additional driving force setting module' of the invention. The processing of steps S130 to S180 computes the additional torque Tadd as the product of the target additional torque Ttag and the reflection rate k, which is set corresponding to the accelerator opening Acc and the vehicle speed V. The hybrid electronic control unit 70 executing the processing of step S190 in the drive control routine of FIG. 2 corresponds to the 'object driving force setting module' of the invention. The processing of step S190 sets the object torque demand T* with restriction of the sum of the computed additional torque Tadd and the base torque demand Tbase to the limit torque Tlim. The hybrid electronic control unit 70 executing the processing of steps S200 to S260 in the drive control routine of FIG. 2, the engine ECU 24 controlling the operation of the engine 22 with the target rotation speed Ne* and the target torque Te*, and the motor ECU 40 controlling the operations of the motors MG1 and MG2 with the torque commands Tm1* and Tm2* are equivalent to the 'controller' of the invention. The processing of steps S200 to S260 sets the target rotation speed Ne* and the target torque Te* of the engine 22 and the torque commands Tm1* and Tm2* of the motors MG1 and MG2 based on the object torque demand T* and sends the settings to the engine ECU 24 and the motor ECU 40. The engine 22 is equivalent to the 'internal combustion engine' of the invention. The power distribution integration mechanism 30 and the motor MG1 correspond to the 'electric power mechanical power input output assembly' of the invention. The motor MG2, the power distribution integration mechanism 30, and the motor MG1 are respectively equivalent to the 'motor', the 'three shaft-type power input output structure', and the 'generator' of the invention. In the second embodiment, the motor 322, the accelerator pedal position sensor 384, and the vehicle speed sensor 388 are respectively equivalent to the 'power source', the 'accelerator opening detector', and the 'vehicle speed detector' of the invention. The electronic control unit 370 executing the processing of step S310 in the drive control routine of FIG. 13 corresponds to the 'base driving force demand setting module' of the invention. The processing of step S310 sets the base torque demand Tbase based on the accelerator opening Acc and the vehicle speed V, with reference to the base torque demand setting map of FIG. 3, which is designed to increase with an increase in accelerator opening Acc and to decrease with an increase in vehicle speed V. The electronic control unit 370 executing the processing of steps S330 to S380 in the drive control routine of FIG. 13 corresponds to the 'additional driving force setting module' of the invention. The processing of steps S330 to S380 computes the additional torque Tadd as the product of the target additional torque Ttag and the reflection rate k, which is set corresponding to the accelerator opening Acc and the vehicle speed V. The electronic control unit 370 executing the processing of step S390 in the drive control routine of FIG. 13 corresponds to the 'object driving force setting module' of the invention. The processing of step S390 sets the object torque demand T* with restriction of the sum of the computed additional torque Tadd and the base torque demand Tbase to the limit torque Tlim. The electronic control unit 370 executing the processing of steps S400 to S420 in the drive control routine of FIG. 13 corresponds to the 'controller' of the invention. The processing of steps S400 to S420 sets the torque command Tm of the motor 322 based on the object torque demand T* and controls the operation of the motor 322 with the set torque command Tm.

The 'power source' is restricted neither to the power system of the first embodiment including the engine 22, the power distribution integration mechanism 30, and the two motors MG1 and MG2 nor to the motor 322 of the second embodiment, but may be any power source including at least a motor configured to output a driving force for driving a vehicle. The motor may be any type of motor. The 'accelerator opening detector' is not restricted to either of the accelerator pedal position sensors 84 and 384 configured to detect the driver's depression amount of the accelerator pedal 83 or 383, but may be any structure designed to detect an accelerator opening.

The 'vehicle speed detector' is not restricted to either of the vehicle speed sensors 88 and 388 but may be any structure designed to detect a vehicle speed. The 'base driving force setting module' is not restricted to the configuration of setting the base torque demand Tbase based on the accelerator opening Acc and the vehicle speed V with reference to the base torque demand setting map of FIG. 3, which is designed to increase with an increase in accelerator opening Acc and to decrease with an increase in vehicle speed V. The base torque demand Tbase may be set without referring to any base torque demand setting map. The 'base driving force setting module' may have any configuration to set a base driving force demand required for driving based on the accelerator opening and the vehicle speed with the tendency of increasing the base driving force demand with an increase in accelerator opening and decreasing the base driving force demand with an increase in vehicle speed. The base driving force demand may be set based on other factors, in addition to or in place of the accelerator opening and the vehicle speed. The 'additional driving force setting module' is not restricted to the configuration of computing the additional torque Tadd as the product of the target additional torque Ttag and the reflection rate k, which is set corresponding to the accelerator opening Acc and the vehicle speed V. The additional torque Tadd may be not equal to the product of the target additional torque Ttag and the reflection rate k. The 'additional driving force setting module' may have any configuration to set an additional driving force based on the accelerator opening and the vehicle speed. The 'object driving force setting module' is not restricted to the configuration of setting the object torque demand T* with restriction of the sum of the computed additional torque Tadd and the base torque demand Tbase to the limit torque Tlim. The 'object driving force setting module' may have any configuration to set an object driving force based on the set base driving force demand and the set additional driving force. The 'controller' may have any configuration to control the power source for driving the vehicle with the set object driving force. The 'controller' may be constructed by a combination of multiple electronic control units like the combination of the hybrid electronic control unit 70, the engine ECU 24, and the motor ECU 40 in the first embodiment or may be constructed by a single electronic control unit like the electronic control unit 370 in the second embodiment. The above mappings of the primary elements in the embodiments to the primary constituents in the claims of the invention are not restrictive in any sense but are only illustrative for concretely describing some modes of carrying out the invention. Namely the embodiments discussed above are to be considered in all aspects as illustrative and not restrictive.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applicable to the manufacturing industries of various vehicles.

The invention claimed is:

1. A vehicle, comprising:
a power source including at least a motor configured to output a driving force for driving the vehicle;
an accelerator opening detector designed to detect an accelerator opening;
a vehicle speed detector designed to detect a vehicle speed;
a base driving force demand setting module programmed to set a base driving force demand required for driving based on the detected accelerator opening and the detected vehicle speed, with a tendency of increasing the base driving force demand with an increase in accelerator opening and decreasing the base driving force demand with an increase in vehicle speed;
an additional driving force setting module programmed to specify a target additional driving force corresponding to the detected vehicle speed, to specify a reflection rate based on the detected accelerator opening and the detected vehicle speed, and to set the additional driving force to a driving force obtained as a product of the specified target additional driving force and the specified reflection rate;
an object driving force setting module programmed to set an object driving force based on the set base driving force demand and the set additional driving force when an absolute value of a difference between an accelerator pedal opening at a first cycle and an accelerator pedal opening at a second cycle is less than a preset reference value, such that the set object driving force is greater than the set base driving force demand; and
a controller programmed to control the power source for driving the vehicle with the set object driving force,
wherein the additional driving force setting module sets a maximum reflection rate based on the detected accelerator opening and the detected vehicle speed, sets an increment of the reflection rate per unit time based on the detected accelerator opening and the detected vehicle speed, and specifies the reflection rate to be increased by the set increment within a range of the set maximum reflection rate,
wherein the additional driving force setting module specifies a target additional driving force corresponding to the detected vehicle speed, specifies a reflection rate based on the detected accelerator opening and the detected vehicle speed, and sets the additional driving force to a driving force obtained as a product of the specified target additional driving force and the specified reflection rate, and
wherein the additional driving force setting module specifies the target additional driving force with a tendency of increasing with an increase in vehicle speed, and specifies the reflection rate with a tendency of increasing with an increase in accelerator opening and with an increase in vehicle speed.

2. The vehicle in accordance with claim 1, wherein the additional driving force setting module sets the additional driving force to a driving force that gradually increases during substantially constant accelerator opening as determined based on the detection of the accelerator opening.

3. The vehicle in accordance with claim 1, wherein the additional driving force setting module sets the additional driving force to a driving force that gradually increases with a decrease of the set base driving force demand during substantially constant accelerator opening as determined based on the detection of the accelerator opening.

4. The vehicle in accordance with claim 1, wherein the additional driving force setting module sets the additional driving force to a driving force that gradually increases after elapse of a preset time period since a start of decreasing the set base driving force demand during substantially constant accelerator opening as determined based on the detection of the accelerator opening.

5. The vehicle in accordance with claim 1, wherein the additional driving force setting module sets the maximum reflection rate with a tendency of increasing with an increase in accelerator opening and with an increase in vehicle speed, and sets the increment of the reflection rate with a tendency of increasing with an increase in accelerator opening.

6. The vehicle in accordance with claim 1, wherein the object driving force setting module sets the object driving force within a range of a previous value of the base driving force demand set immediately before assumption of a substantially constant accelerator opening based on the detection of the accelerator opening.

7. The vehicle in accordance with claim 1, wherein the power source includes: an internal combustion engine; an electric power-mechanical power input output assembly connected to a driveshaft linked with an axle of the vehicle, connected to an output shaft of the internal combustion engine to be independently rotatable from the driveshaft, and configured to output power to the driveshaft and to the output shaft through input and output of electric power and mechanical power; and a motor configured to input and output power from and to the driveshaft.

8. The vehicle in accordance with claim 7, wherein the electric power-mechanical power input output assembly includes: a three shaft-type power input output structure connected with three shafts, the driveshaft, the output shaft, and a rotating shaft and configured to input and output power to and from a residual shaft based on powers input to and output from any two shafts among the three shafts; and a generator configured to input and output power from and to the rotating shaft.

\* \* \* \* \*

UNITED STATES PATENT AND TRADEMARK OFFICE
CERTIFICATE OF CORRECTION

PATENT NO. : 8,612,112 B2 Page 1 of 1
APPLICATION NO. : 12/084403
DATED : December 17, 2013
INVENTOR(S) : Kiyoshiro Ueoka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this
Twenty-second Day of September, 2015

Michelle K. Lee
*Director of the United States Patent and Trademark Office*